(12) United States Patent
Kim et al.

(10) Patent No.: US 9,215,016 B2
(45) Date of Patent: Dec. 15, 2015

(54) METHOD AND APPARATUS FOR MITIGATING INTER-CELL INTERFERENCE IN WIRELESS COMMUNICATION SYSTEM

(75) Inventors: Hyung Tae Kim, Anyang-si (KR); Han Byul Seo, Anyang-si (KR); Ki Jun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 896 days.

(21) Appl. No.: 13/388,443

(22) PCT Filed: Jun. 9, 2010

(86) PCT No.: PCT/KR2010/003681
§ 371 (c)(1),
(2), (4) Date: Feb. 1, 2012

(87) PCT Pub. No.: WO2011/052869
PCT Pub. Date: May 5, 2011

(65) Prior Publication Data
US 2012/0201162 A1      Aug. 9, 2012

Related U.S. Application Data

(60) Provisional application No. 61/255,496, filed on Oct. 28, 2009, provisional application No. 61/257,845, filed on Nov. 4, 2009.

(30) Foreign Application Priority Data

Apr. 20, 2010   (KR) ........................ 10-2010-0036469

(51) Int. Cl.
*H04J 1/16* (2006.01)
*H04B 17/345* (2015.01)
*H04W 72/04* (2009.01)

(52) U.S. Cl.
CPC ................ *H04B 17/345* (2015.01); *H04J 1/16* (2013.01); *H04W 72/04* (2013.01)

(58) Field of Classification Search
USPC .......................................................... 370/252
See application file for complete search history.

(56) References Cited

U.S. PATENT DOCUMENTS

| | | |
|---|---|---|
| 2006/0210001 A1 | 9/2006 | Li et al. |
| 2007/0223606 A1 | 9/2007 | Yang et al. |
| 2008/0057996 A1 | 3/2008 | Sung et al. |
| 2011/0044259 A1* | 2/2011 | Nimbalker et al. ........... 370/329 |
| 2011/0268007 A1* | 11/2011 | Barany et al. ................. 370/312 |

FOREIGN PATENT DOCUMENTS

JP     2008529375     7/2008

* cited by examiner

*Primary Examiner* — Gregory Sefcheck
*Assistant Examiner* — Majid Esmaeilian
(74) *Attorney, Agent, or Firm* — Lee, Hong, Degerman, Kang & Waimey

(57) ABSTRACT

A method and apparatus of mitigating inter-cell interference in a wireless communication system are provided. A user equipment receives serving-cell data over a first data channel indicated by a first control channel for which decoding is successful by monitoring a plurality of candidate control channels in a search space of a serving cell. The user equipment receives interfering-cell data over a second data channel indicated by a second control channel for which decoding is successful by monitoring a plurality of candidate control channels in a search space of an interfering cell. The A user equipment cancels interference from the interfering cell by processing the serving-cell data and the interfering-cell data.

13 Claims, 11 Drawing Sheets

[Fig. 11]
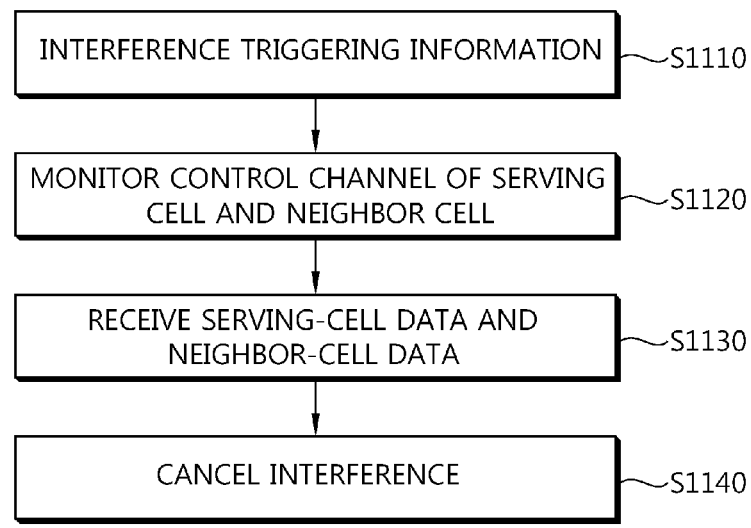
Fig. 12
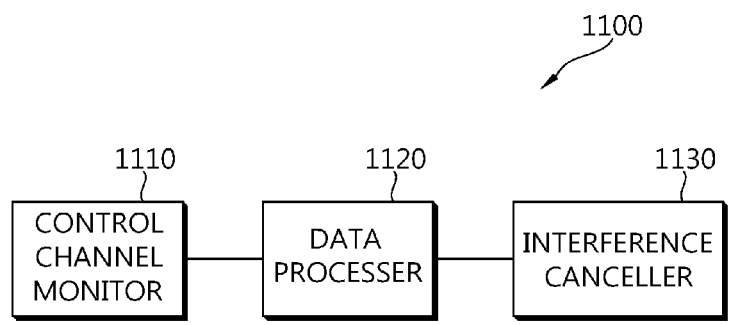

METHOD AND APPARATUS FOR MITIGATING INTER-CELL INTERFERENCE IN WIRELESS COMMUNICATION SYSTEM

CROSS-REFERENCE TO RELATED APPLICATIONS

This application is the National Stage filing under 35 U.S.C. 371 of International Application No. PCT/KR2010/003681, filed on Jun. 9, 2010, which claims the benefit of earlier filing date and right of priority to Korean Application No. 10-2010-0036469, filed on Apr. 20, 2010, and also claims the benefit of U.S. Provisional Application Ser. No. 61/257,845, filed on Nov. 4, 2009, and 61/255,496, filed on Oct. 28, 2009, the contents of which are all incorporated by reference herein in their entirety.

TECHNICAL FIELD

The present invention relates to wireless communications, and more particularly, to an apparatus and method for mitigating inter-cell interference in a wireless communication system.

BACKGROUND ART

Wireless communication systems are widely spread all over the world to provide various types of communication services such as voice or data. In general, the wireless communication system is a multiple access system capable of supporting communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

With the advent of various communication systems, a heterogeneous network environment in which various cells coexist in a local area is taken into account. For example, a micro cell having relatively low power transmit power (e.g., a pico cell, a femto cell, etc.) exists in the coverage of one macro cell. In addition, a cell can be classified into an open access (OA) cell which can receive a service any time when necessary without additional access restriction and a closed subscriber group (CSG) cell of which access is allowed for only a specific user.

Interference between heterogeneous cells may occur seriously in the heterogeneous network. A transmit power difference between the cells results in a signal characteristic in which a serving cell selected according to received signal power is weaker than a neighbor cell due to a path loss.

For example, it is assumed that a macro user equipment (UE) belonging to a macro cell approaches to a micro cell. An uplink signal of the macro UE may strongly interfere to the micro cell. In addition, a downlink signal of the macro cell may have weak signal strength due to interference with the micro cell neighboring to the macro UE. In particular, if the neighbor micro cell is a CSG cell, it is difficult for the macro UE to move to the micro cell, and thus the macro UE may experience serious deterioration in a communication service.

Accordingly, there is a need for mitigating inter-cell interference in a wireless communication system in which various cells coexist.

DISCLOSURE OF INVENTION

Technical Problem

The present invention provides a method and apparatus for mitigating inter-cell interference in a wireless communication system.

Solution to Problem

In an aspect, a method of mitigating inter-cell interference in a wireless communication system is provided. The method includes receiving serving-cell data over a first data channel indicated by a first control channel for which decoding is successful by monitoring a plurality of candidate control channels in a search space of a serving cell, receiving interfering-cell data over a second data channel indicated by a second control channel for which decoding is successful by monitoring a plurality of candidate control channels in a search space of an interfering cell, and cancelling interference from the interfering cell by processing the serving-cell data and the interfering-cell data.

A frequency band of the serving cell may entirely or partially overlap with a frequency band of the interfering cell.

The serving cell may uses a first component carrier, the neighbor cell may uses a second component carrier, and a frequency band of the first component carrier may entirely or partially overlap with a frequency band of the second component carrier.

The interference may be cancelled by removing the interfering-cell data from the serving-cell data as interference.

The method may further include receiving information for triggering monitoring on a control channel of the interfering cell from the serving cell.

Decoding may be successful if no error occurs when an interference identifier is demasked from a cyclic redundancy check (CRC) of downlink control information (DCI) of the second control channel.

In another aspect, a wireless apparatus includes a control channel monitor configured to monitor a plurality of candidate control channels in a search space of a serving cell and a neighbor cell, a data processor configured to restore serving-cell data on a first data channel indicated by a first control channel of the serving cell, and to restore neighbor-cell data over a second data channel indicated by a second control channel of the neighbor cell, and an interference canceller configured to cancel interference from the interfering cell by processing the serving-cell data and the interfering-cell data.

In still another aspect, a method of mitigating inter-cell interference in a wireless communication system is provided. The method includes obtaining, by a user equipment, interference information from an interfering cell, wherein the interference information comprises at least one of a resource region, precoding and a subframe pattern used by the interfering cell, and feeding back, by a user equipment, channel feedback information generated based on the interference information to a serving cell.

Advantageous Effects of Invention

Inter-cell interference can be mitigated in a heterogeneous network in which various cells co-exist, and quality of service can be improved.

BRIEF DESCRIPTION OF DRAWINGS

FIG. 11 is a flowchart showing a method of mitigating inter-cell interference according to an embodiment of the present invention.

FIG. 12 shows a wireless apparatus for implementing an embodiment of the present invention.

MODE FOR THE INVENTION

A user equipment (UE) may be fixed or mobile, and may be referred to as another terminology, such as a mobile station (MS), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved-nodeB (eNB), a base transceiver system (BTS), an access point, etc.

Hereinafter, downlink (DL) represents a communication link from the BS to the UE, and uplink (UL) represents a communication link from the UE to the BS. In the DL, a transmitter may be a part of the BS, and a receiver may be a part of the UE. In the UL, the transmitter may be a part of the UE, and the receiver may be a part of the BS.

The BS can provide a service for one or more cells. The cell can be classified into a macro cell and a micro cell according to coverage (or maximum transmit power). The macro cell has wider coverage and greater transmit power than the micro cell. Alternatively, the cell can be classified into an open access (OA) cell and a closed subscriber group (CSG) cell according to user accessibility. The CSG cell basically aims to provide a service specified only for a member belonging to a CSG.

Figure 1:
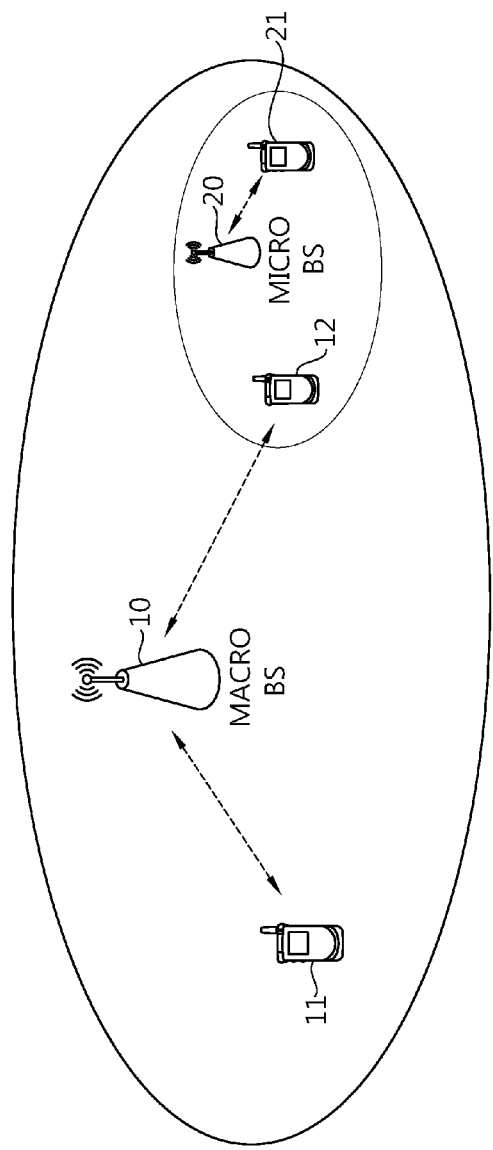
FIG. 1 shows an example of a heterogeneous network.

FIG. 1 shows an example of a heterogeneous network.

A macro BS 10 provides a service for a macro cell. A micro BS 20 provides a service for a micro cell. UEs 11 and 12 receiving a service from the macro cell are referred to as macro UEs. A serving cell of the macro UE is the macro cell. A UE 21 receiving a service from the micro cell is referred to as a micro UE. A serving cell of the micro UE is the micro cell.

The coverage of the macro cell may overlap with the coverage of the micro cell, and the macro UE 12 neighboring to the micro cell is located in an overlapping area.

The macro UE 11 relatively far from the coverage of the micro cell is not significantly affected by interference with the micro cell. However, the macro UE 12 located in the coverage of the micro cell may be significantly affected by interference with the micro cell.

Now, frame and control channel structures of Long Term Evolution (LTE) based on 3rd Generation Partnership Project (3GPP) Technical Specification (TS) release 8 will be described.

Figure 2:
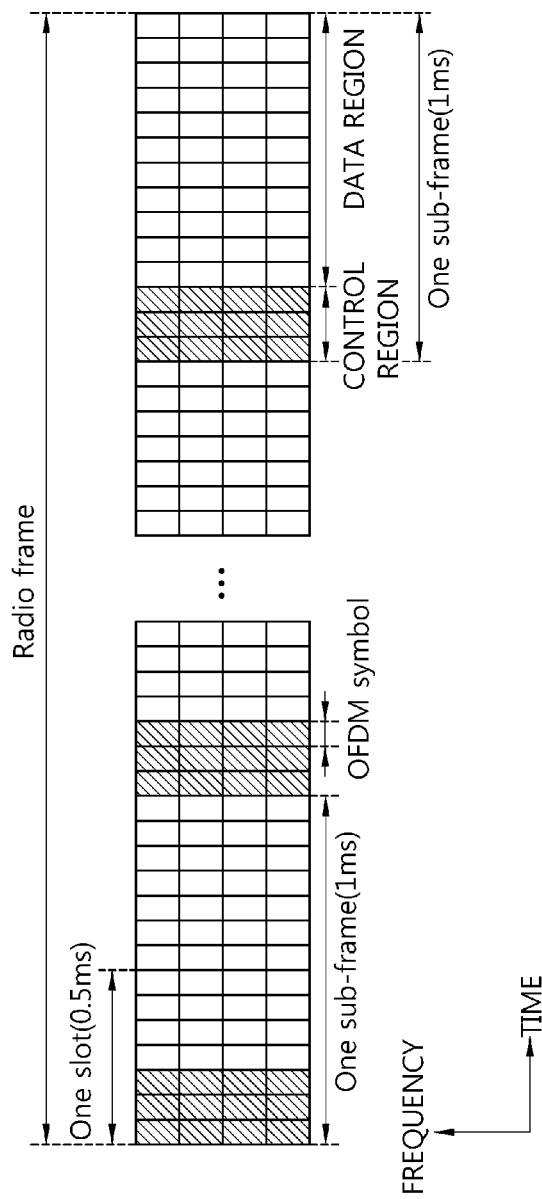
FIG. 2 shows a structure of a radio frame in a 3rd generation partnership project (3GPP) long term evolution (LTE).

FIG. 2 shows a radio frame structure in 3rd generation partnership project (3GPP) long term evolution (LTE). The section 6 of 3GPP TS 36.211 V8.5.0 (2008-12) "Evolved Universal Terrestrial Radio Access (E-UTRA); Physical Channels and Modulation (Release 8)" may be incorporated herein by reference. A radio frame consists of 10 subframes indexed with 0 to 9. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink, the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.5.0 (2008-12), in case of a normal CP, one subframe includes 7 OFDM symbols, and in case of an extended CP, one subframe includes 6 OFDM symbols.

As disclosed in 3GPP TS 36.211 V8.5.0 (2008-12) "Evolved Universal Terrestrial Radio Access (E-UTRA); Physical Channels and Modulation (Release 8)", physical channels of the LTE can be classified into data channels, i.e., a physical downlink shared channel (PDSCH) and a physical uplink shared channel (PUSCH), and control channels, i.e., a physical downlink control channel (PDCCH), a physical control format indicator channel (PCFICH), a physical hybrid-ARQ indicator channel (PHICH), and a physical uplink control channel (PUCCH).

A subframe is divided into a control region and a data region in time domain. The control region can include up to four preceding OFDM symbols of a 1st slot in the subframe. The number of OFDM symbols included in the control region may vary. A PDCCH is allocated to the control region, and a PDSCH is allocated to the data region.

A resource block (RB) is a resource allocation unit, and includes a plurality of subcarriers in one slot. For example, if one slot includes 7 OFDM symbols in a time domain and an RB includes 12 subcarriers in a frequency domain, one RB can include 7×12 resource elements (REs).

Control information transmitted through the PDCCH is referred to as downlink control information (DCI). The DCI may include resource allocation of the PDSCH (this is referred to as a downlink grant), resource allocation of a PUSCH (this is referred to as an uplink grant), a set of transmit power control commands for individual UEs in any UE group and/or activation of a voice over Internet protocol (VoIP).

A PCFICH transmitted in a 1st OFDM symbol in the subframe carries a control format indicator (CFI) regarding the number of OFDM symbols (i.e., a size of the control region)

used for transmission of control channels in the subframe. The UE first receives the CFI on the PCFICH, and thereafter monitors the PDCCH.

A PHICH can carry an positive-acknowledgement (ACK)/negative-acknowledgement (NACK) signal for uplink hybrid automatic repeat request (HARM). The ACK/NACK signal for uplink data transmitted by the UE is transmitted on the PHICH.

Figure 3:
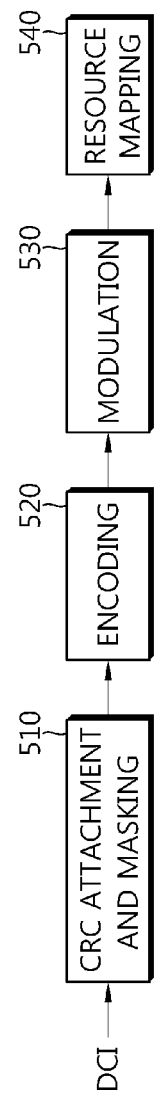
FIG. 3 is a block diagram showing a structure of a physical downlink control channel (PDCCH).

FIG. 3 is a block diagram showing a structure of a PDCCH. A BS determines a PDCCH format according to DCI to be transmitted to a UE. Thereafter, the BS attaches a cyclic redundancy check (CRC) to the DCI, and masks a unique identifier (referred to as a radio network temporary identifier (RNTI)) to the CRC according to an owner or usage of the PDCCH (block 510).

If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

When the C-RNTI is used, the PDCCH carries control information for a specific UE (this is referred to as UE-specific control information), and when other RNTIs are used, the PDCCH carries common control information received by all or a plurality of UEs in a cell.

The CRC-attached DCI is encoded to generate coded data (block 520). Encoding includes channel encoding and rate matching.

The coded data is modulated to generate modulation symbols (block 530).

The modulation symbols are mapped to physical resource elements (REs) (block 540). The modulation symbols are respectively mapped to the REs.

Figure 4:
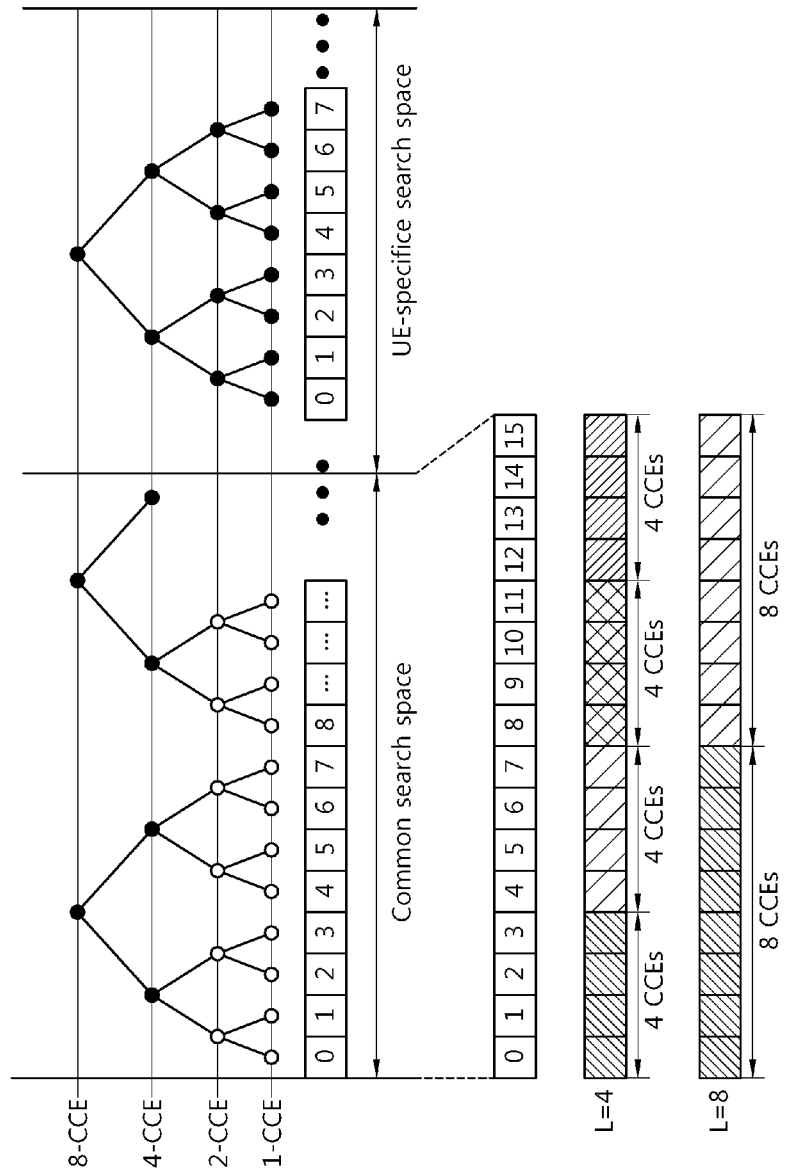
FIG. 4 shows an example of PDCCH monitoring.

FIG. 4 shows exemplary monitoring of a PDCCH. This can refer to the section 9 of 3GPP TS 36.213 V8.5.0 (2008-12). The 3GPP LTE uses blind decoding for PDCCH detection. In the blind decoding, a specific identifier is de-masked from a CRC of a PDCCH (referred to as a candidate PDCCH), and then CRC error checking is performed to determine whether the PDCCH is a control channel of an entity performing the blind decoding.

A plurality of PDCCHs can be transmitted in one subframe. A UE monitors a plurality of PDCCHs in every subframe. Monitoring is an operation of attempting PDCCH decoding by the UE according to a format of the monitored PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The 3GPP LTE uses a search space to reduce an overload caused by blind decoding. The search is a monitoring set of CCEs for PDCCH. A UE monitors in the corresponding search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. In the common search space, a PDCCH for UE-specific control control information (e.g. DCI format 0, 1A) can be transmitted. The UE-specific search space supports a PDCCH having a CCE aggregation level of {1, 2, 4, 8}.

Table 1 shows the number of PDCCH candidates to be monitored by a UE.

TABLE 1

| Search Space Type | Aggregation level L | Size [in CCEs] | Number of PDCCH candidates | DCI formats |
|---|---|---|---|---|
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

The size of the search space is defined in the Table 1, and the starting position of the search space is different between the UE-specific search space and common search space. The starting position of the common search space is fixed regardless of subframe, but the starting position of the UE-specific search space may be determined every subframe and may be obtained based on a UE's identifier (i.e. C-RNTI), a CCE aggregation level and/or the slot number in the subframe. The UE-specific search space may be overlapped with the common search space if the starting position of the UE-specific search space is in the common search space.

Now, a multiple carrier system will be described.

The 3GPP LTE system supports a case where a downlink bandwidth and an uplink bandwidth are set differently under the premise that one component carrier (CC) is used. This implies that the 3GPP LTE is supported only for a case where the downlink bandwidth and the uplink bandwidth are equal to or different from each other in a situation where one CC is defined for each of a downlink and an uplink. For example, the 3GPP LTE may support up to 20 MHz, and supports only one CC for the uplink and the downlink even if the uplink bandwidth and the downlink bandwidth may be different from each other.

Spectrum aggregation (also referred to as bandwidth aggregation or carrier aggregation) is for supporting a plurality of CCs. The spectrum aggregation is introduced to support an increasing throughput, to prevent cost rising caused by introduction of a broadband radio frequency (RF) device, and to ensure compatibility with a legacy system. For example, when 5 CCs are assigned with a granularity of a carrier unit having a bandwidth of 20 MHz, a bandwidth of up to 100 MHz can be supported.

The spectrum aggregation can be classified into contiguous spectrum aggregation achieved between consecutive carriers in frequency domain and non-contiguous spectrum aggregation achieved between discontinuous carriers. The number of carriers aggregated in downlink may be different from the number of carriers aggregated in uplink. Symmetric aggregation is achieved when the number of downlink carriers is equal to the number of uplink carriers. Asymmetric aggregation is achieved when the number of downlink carriers is different from the number of uplink carriers.

CCs may have different sizes (i.e., bandwidths). For example, when 5 CCs are used to configure a band of 70 MHz, the band can be configured as 5 MHz carrier (CC #0)+20 MHz carrier (CC #1)+20 MHz carrier (CC #2)+20 MHz carrier (CC #3)+5 MHz carrier (CC #4).

Hereinafter, a multiple carrier system implies a system supporting multiple carriers on the basis of spectrum aggregation. The multiple carrier system can use contiguous spectrum aggregation and/or non-contiguous spectrum aggregation, and also can use either symmetric aggregation or asymmetric aggregation.

Cross-carrier scheduling is possible between multiple carriers. That is, a PDSCH of the CC #2 may be indicated using a downlink grant (or an uplink grant) of a PDCCH of the CC #1. A CC on which the PDCCH is transmitted may be referred to as a reference carrier or a primary carrier. A CC on which a PDSCH is transmitted may be referred to a secondary carrier.

Figure 5:
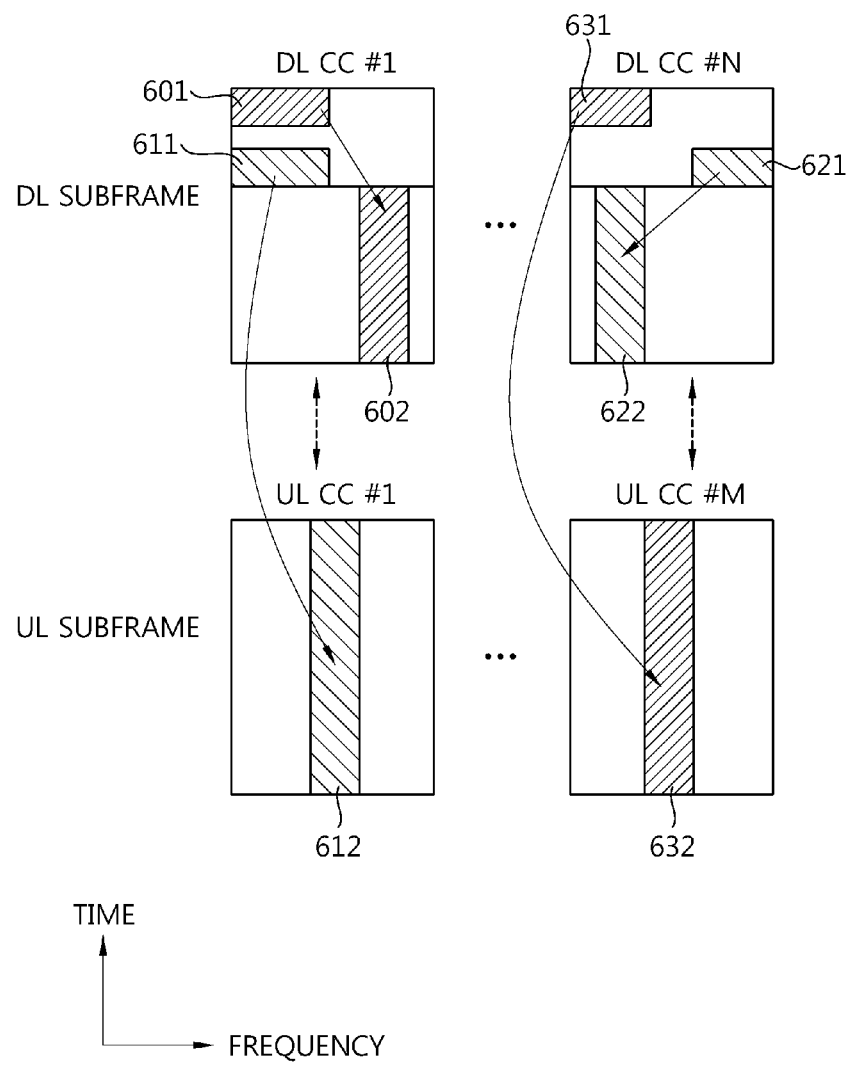
FIG. 5 shows an example of uplink (UL) transmission and downlink (DL) transmission in a multiple carrier system.

FIG. 5 shows an example of UL transmission and DL transmission in a multiple carrier system. The number of DL CCs is N(N>1), and the number of UL CCs is M(M>=1).

A PDCCH 601 of a DL CC #1 carries a DL grant for a PDSCH 602 of the DL CC #1. The PDSCH 602 is configured by using the DL grant included in DCI of the PDCCH 601. A PDCCH 611 of the DL CC #1 carries a UL grant for a PUSCH 612 of a UL CC #1. The PUSCH 612 is configured by using the UL grant included in DCI of the PDCCH 611.

A PDCCH 621 of a DL CC #N carries a DL grant for a PDSCH 622 of the DL CC #N. A PDCCH 631 of the DL CC #N carries a UL grant for a PUSCH 632 of a UL CC #M.

Figure 6:
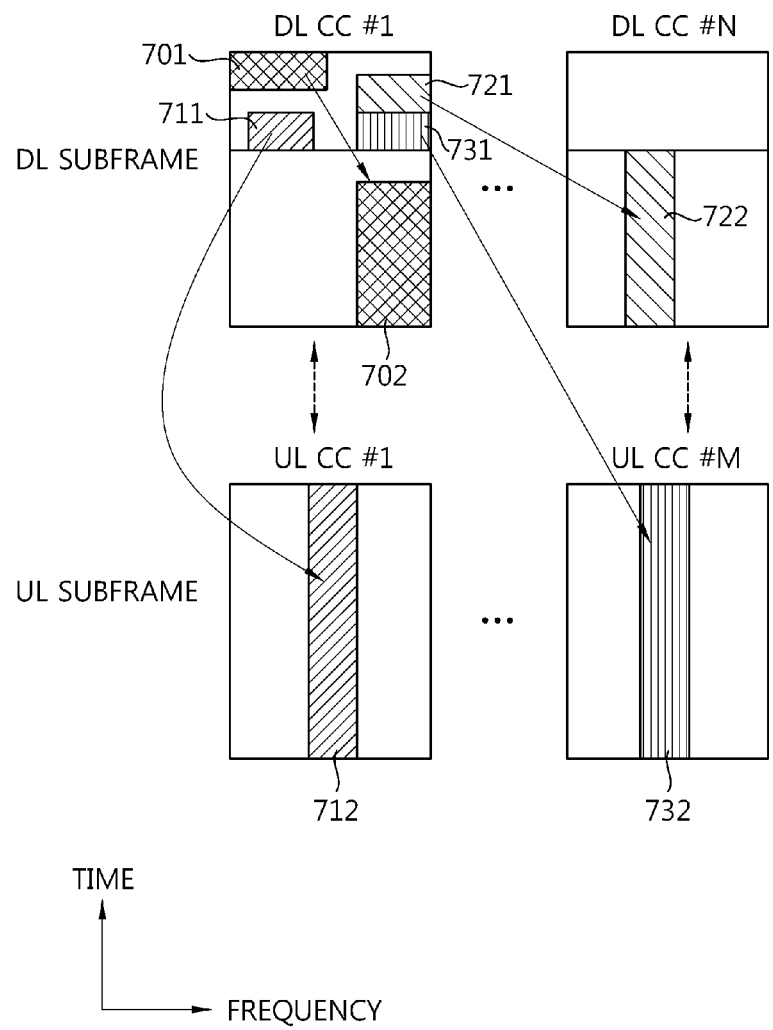
FIG. 6 shows another example of UL transmission and DL transmission in a multiple carrier system.

FIG. 6 shows another example of UL transmission and DL transmission in a multiple carrier system. In comparison with the example of FIG. 5, a case of allowing cross-carrier scheduling is shown in FIG. 6. The cross-carrier scheduling implies that a PDCCH-PUSCH pair can be scheduled not only to the same DL CC but also to different DL CCs.

A first PDCCH 701 of the DL CC #1 carries a DL grant of a PDSCH 702 of the DL CC #1. A second PDCCH 711 of the DL CC #1 carries a UL grant of a PUSCH 712 of a UL CC #1. A third PDCCH 721 of the DL CC #1 carries a DL grant of a PDSCH 722 of a DL CC #N. A fourth PDCCH 731 of the DL CC #1 carries a UL grant of a PUSCH 732 of a UL CC #M.

Once cross-carrier scheduling is applied, a PDCCH for a plurality of CCs is transmitted in a control region of a DL subframe, and information on a UL CC/DL CC using a UL grant/DL grant may be included in DCI of the PDCCH. Information indicating a CC for cross-carrier scheduling is referred to as a carrier indicator field (CIF).

Now, a method of mitigating inter-cell interference in a heterogeneous network will be described.

In the heterogeneous network in which heterogeneous cells coexist, inter-cell interference may significantly deteriorate quality of service. Further, when a reception error occurs due to interference in a control channel such as a PDCCH, a severe data loss may be caused since a UE cannot know whether a PDSCH exists.

Figure 7:
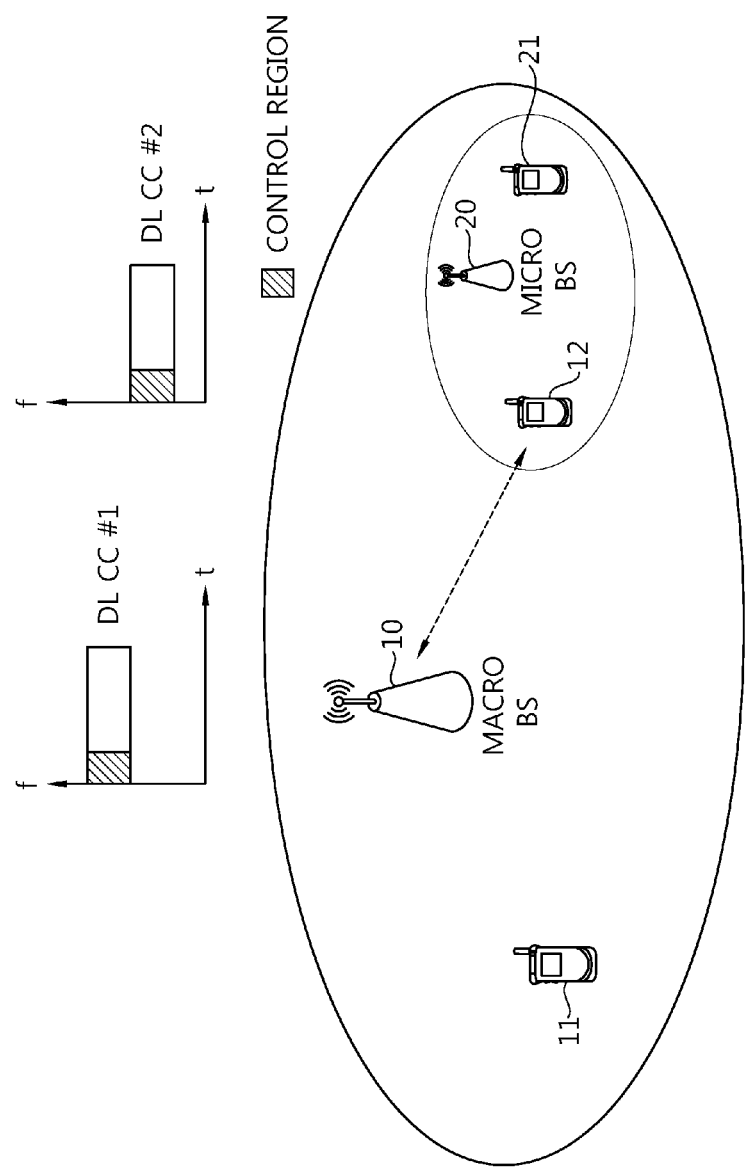
FIG. 7 shows an example of operating a heterogeneous network.

FIG. 7 shows an example of operating a heterogeneous network.

A macro cell 10 uses a DL CC #1. A micro cell 20 uses a DL CC #2. In this case, the DL CC #1 and the DL CC #2 use different frequency bands. For example, at a full bandwidth of 20 MHz, if the DL CC #1 occupies a bandwidth of 15 MHz and the DL CC #2 occupies a bandwidth of 5 MHz, the DL CC #1 and the DL CC #2 do not overlap in a frequency domain.

Therefore, there is an advantage in that the network can operate without interference between the macro cell and the micro cell. Disadvantageously, however, spectral efficiency is low in this case.

To obtain higher frequency efficiency, frequency bands may overlap partially or entirely between cells.

Figure 8:
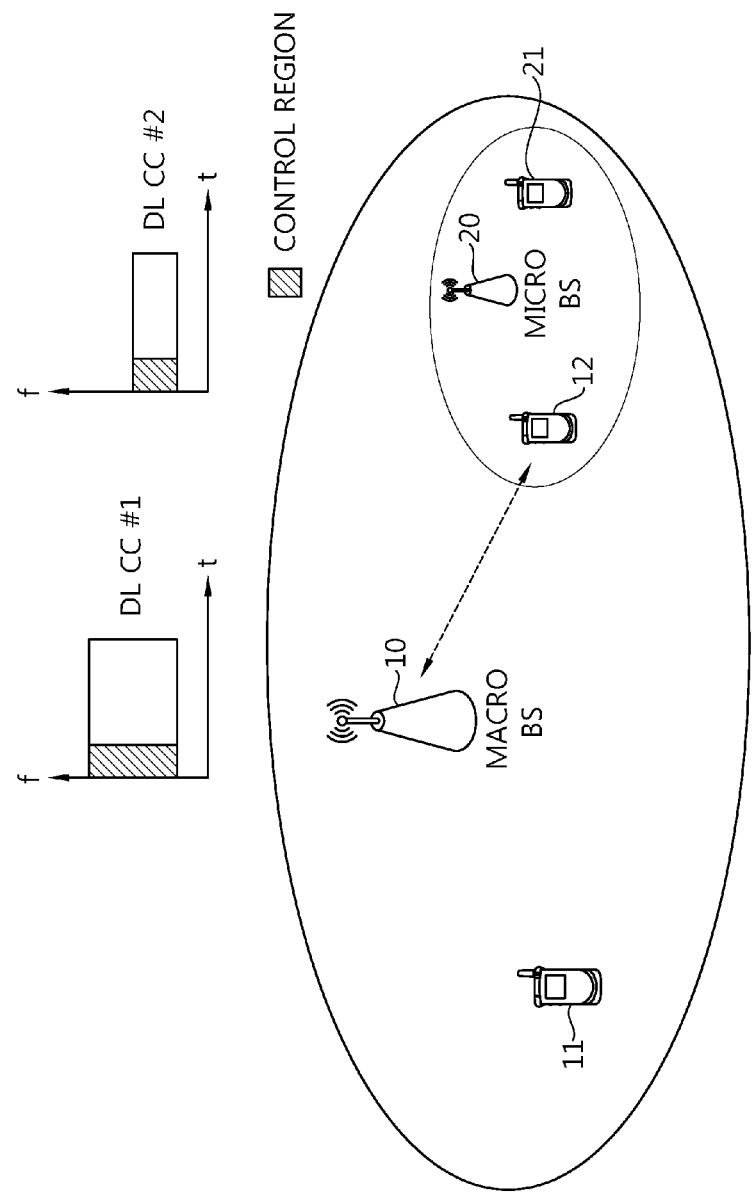
FIG. 8 shows another example of operating a heterogeneous network.

FIG. 8 shows another example of operating a heterogeneous network.

A macro cell 10 uses a DL CC #1. A micro cell 20 uses a DL CC #2. In this case, the DL CC #1 and the DL CC #2 use overlapping frequency bands. For example, at a full bandwidth of 15 MHz, the DL CC #1 occupies a bandwidth of 15 MHz, and the DL CC #2 occupies a bandwidth of 5 MHz which partially overlaps with the DL CC #1.

In comparison with the example of FIG. 6, interference caused by inter-cell interference exists in the example of FIG. 8, but higher spectral efficiency can be obtained in this case.

Figure 9:
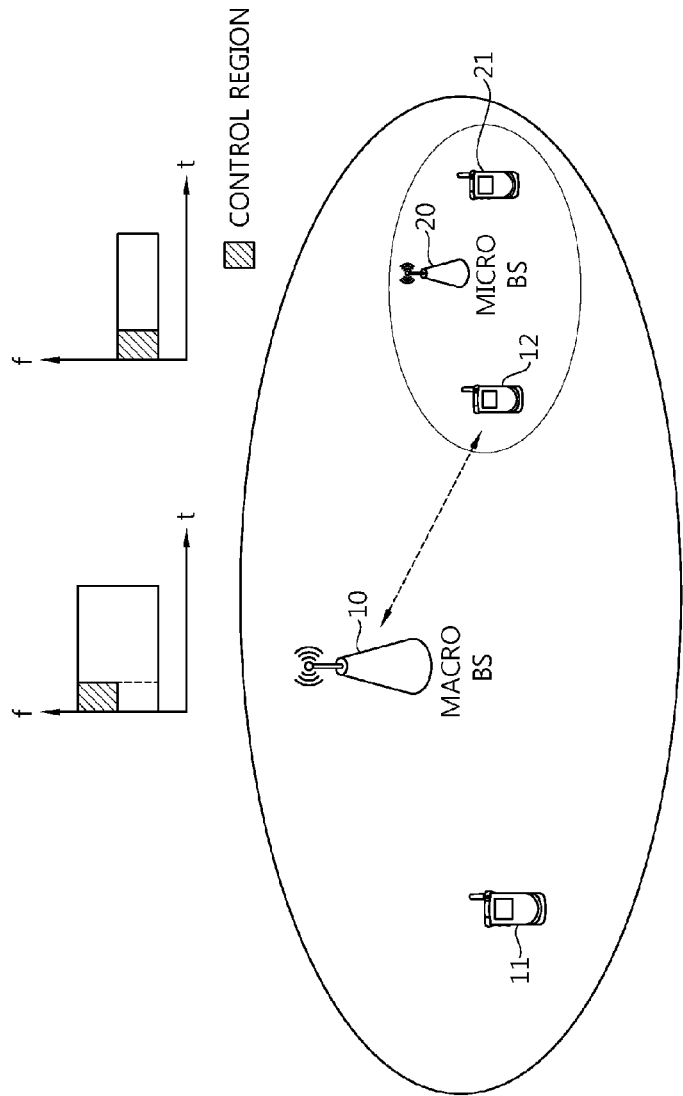
FIG. 9 shows another example of operating a heterogeneous network.

FIG. 9 shows another example of operating a heterogeneous network. In comparison with the example of FIG. 7, a control region for transmitting a PDCCH is configured by avoiding overlapping between cells. This is because the PDCCH is generally transmitted with maximum transmit power and thus produces significant inter-cell interference, and an error of the PDCCH may cause a data loss.

A micro UE interfered with a macro cell can basically operate without special interference control. This is because a path loss is small due to a small cell radius of the micro cell. Unlike the macro cell, the micro cell provides a service for a smaller number of users, and thus it is possible to allocate a wideband resource to one user. Therefore, even if interference is strong to some extent, a data transfer rate can be compensated for by scheduling a more amount of resources.

In a case where a frequency band of the macro cell partially or entirely overlaps with a frequency band of the micro cell, if a macro UE 12 performs successive interference cancellation (SIC) at an overlapping frequency band, interference from the micro cell can be reduced. That is, interference can be reduced through the following procedure. First, the macro UE 12 decodes DL data of the micro cell at the overlapping frequency band. After re-encoding DL data which is successfully decoded, a signal received from the micro cell is re-generated by multiplying a channel with respect to an estimated micro cell. The generated signal of the micro cell is subtracted from the received signal, and thus the interference from the micro cell can be cancelled. Thereafter, the DL data of the macro cell is decoded.

For the SIC, the macro UE 12 has to be able to decode the DL data of the micro cell. For this, the following decoding control information is necessary.

(1) Modulation and coding scheme (MCS): The macro UE has to know an MCS to restore the DL data of the micro cell. Blind decoding may be performed in a state of not knowing the MCS, but this may increase complexity of the UE. The macro UE may perform SIC when it is determined that decoding is possible with a corresponding MCS after measuring a channel gain by using a reference signal of the micro cell.

(2) Resource allocation: The macro UE has to know information related to a radio resource allocated to a data channel for the DL data of the micro cell.

(3) Reference signal of micro cell: To decode the DL data of the micro cell, a channel between the macro UE and the micro cell needs to be estimated by using a reference signal of the micro cell. To increase channel estimation capability, the macro cell may not be allowed to transmit a signal in a region in which the reference signal of the micro cell is transmitted.

(4) Identifier of scheduled micro UE: In order for the macro UE to overhear a PDCCH of the micro UE, a C-RNTI of the micro UE used in PDCCH monitoring needs to be known.

If a backhaul link is present to ensure a low latency between the macro cell and the micro cell, the micro cell may report decoding control information to the macro cell, and the macro cell may forward the decoding control information to the macro UE. However, if the latency of the backhaul link is not low, the above method is restricted, and new DCI needs to be defined to carry the decoding control information of the micro cell.

Figure 10:
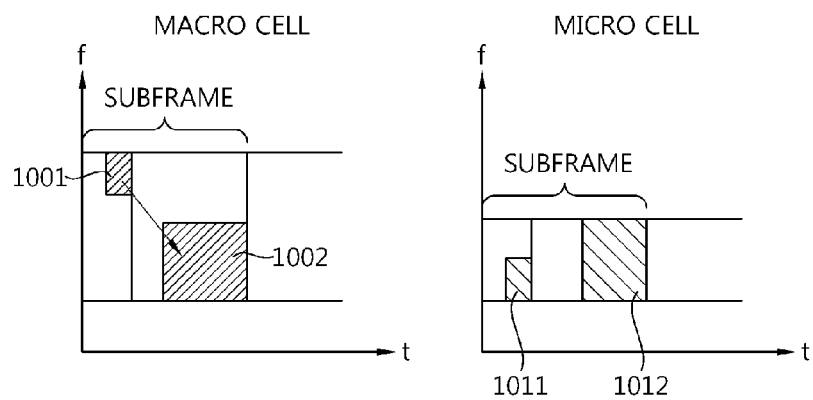
FIG. 10 shows an example of resource allocation of a macro cell and a micro cell.

FIG. 10 shows an example of resource allocation of a macro cell and a micro cell.

DCI for a PDSCH 1002 is transmitted over a PDCCH 1001 of the macro cell. DCI for a PDSCH 1012 is transmitted over a PDCCH 1011 of the micro cell. A resource of the PDSCH 1002 of the macro cell overlaps with that of the PDSCH 1012 of the micro cell.

If a macro UE is able to receive DCI over the PDCCH 1011 of the micro cell, SIC can be performed by restoring DL data over the PDSCH 1012 of the micro cell.

In order for the macro UE to receive the DCI over the PDCCH 1011 of the micro cell, the following method can be performed.

In a first embodiment, the PDCCH 1011 of a micro UE can be overheard by the macro UE. Overhearing implies that the macro UE can monitor the PDCCH 1011 even though the micro cell transmits the PDCCH 1011 to the micro UE.

A CRC of the DCI over the PDCCH 1011 of the micro cell is masked to a C-RNTI of the micro UE. Therefore, in order for the macro UE to overhear the PDCCH 1011, the C-RNTI of the micro UE needs to be known.

If the number of micro UEs in the micro cell is small, or if the number of micro UEs that can be scheduled in a specific time period can be limited, the macro UE can perform blind decoding by using respective C-RNTIs belonging to a set of C-RNTIs for a set of schedulable micro UEs.

First, the macro UE monitors a PDCCH by using the respective C-RNTIs belonging to a set of possible C-RNTIs in a UE-specific search space of the micro cell. If the PDCCH is successfully decoded, DL data of the micro UE is received over the PDSCH 1012, and this data is decoded to obtain micro DL data. Macro DL data is received over the PDSCH 1002 indicated by the PDCCH 1001 of the macro UE. The UE can cancel interference between the macro cell and the micro cell by removing the micro DL data from the macro DL data.

The macro UE requires identifier information on a set of C-RNTIs of the micro UE to perform blind decoding in the micro cell.

As a first example, the identifier information may be reported by the macro cell to the macro UE. The micro cell may report the identifier information to the macro cell, and thereafter the macro cell may transmit the identification information to the macro UE through a radio channel.

As a second example, the micro cell may transmit the identifier information to the macro UE through the radio channel.

As a third example, the identifier information may be indirectly reported to the macro UE in association with a cell ID of the micro cell. For example, C-RNTIs included in the identifier information are obtained based on the cell ID of the micro cell. The cell ID of the micro cell can be known when the macro UE receives a primary synchronization signal (PSS) and a secondary synchronization signal (SSS) of the micro cell.

By performing PDCCH monitoring of the micro cell, the macro UE can obtain DL data of the micro cell acting as interference. Inter-cell interference can be mitigated in a heterogeneous network when the macro UE performs SIC.

An interfering cell (i.e., the micro cell) limits the number of control channels, a transmission format, and the number of UEs to be scheduled so that an interfered UE (i.e., the macro UE) can obtain control information on an interference signal (i.e., DL data of the micro cell). The micro cell directly or indirectly reports information on the limited control channel to the macro UE, so that the macro UE can restore the interference signal. By using the SIC, the macro UE can reliably detect a DL signal of the desired macro cell.

In a second embodiment, the micro cell can define a DCI format for the macro cell (referred to as a macro DCI format). The macro DCI is DCI that can be received by the macro UE although it is transmitted in a control region of the micro cell. The macro DCI over the PDCCH 1011 includes information for receiving the PDSCH 1012 of the micro cell.

A CRC of the macro DCI may be masked to a C-RNTI of the macro UE, or to a predetermined dedicated identifier.

The dedicated identifier masked to the CRC of the macro DCI is referred to as an interference-RNTI (I-RNTI). The I-RNTI is information shared between the micro cell and the macro UE. The macro DCI masked to the I-RNTI can be monitored in a common search space or a UE-specific search space.

The micro cell limits the number of control channels, the transmission format, and the number of UEs to be scheduled so that the interfered macro UE can obtain control information on an interference signal (i.e., DL data of the micro cell). The macro UE can restore the interference signal by detecting the control channel of the micro cell by using the I-RNTI. By using SIC, the macro UE can reliably detect DL data of the desired macro cell.

Although the above embodiments describe the macro cell and the micro cell by taking examples, the present invention is not limited thereto. Thus, the technical features of the present invention can also apply to mitigate inter-cell interference occurring between at least two cells.

FIG. 11 is a flowchart showing a method of mitigating inter-cell interference according to an embodiment of the present invention. This method can be performed by a UE.

The UE receives interference triggering information from a serving cell (step S1110). The interference triggering information is information that instructs the start of an interference cancellation operation when the UE is located near an interfering cell. More specifically, the interference triggering information can instruct the UE to trigger monitoring on a control channel of the interfering cell. The UE reports location information to the serving cell to indicate that the UE approaches near to the interfering cell, and based on this information, the serving cell can transmit the interference triggering information to the UE.

The interfering cell is a cell that interferes with communication between the UE and the serving cell. A frequency band of the serving cell may partially or entirely overlap with a frequency band of the interfering cell. In a multiple carrier system, a CC of the serving cell may partially or entirely overlap with a frequency band of a CC of a neighbor cell. If the serving cell is a macro cell and the interfering cell is a micro cell, the UE may be located in the coverage of the micro cell.

The UE monitors a control channel of the serving cell and the neighbor cell (step S1120). The UE monitors a plurality of candidate PDCCHs in a search space of the serving cell or the neighbor cell, and if no CRC error is detected, considers that decoding is successful.

The UE receives serving-cell data and neighbor-cell data (step S1130). The UE receives the serving-cell data over a PDSCH indicated by a DL grant included in DCI over a PDCCH for which decoding is successful. The UE receives the interfering-cell data over the PDSCH indicated by the DL grant included in the DCI over the PDCCH for which decoding is successful.

The UE cancels interference from the interfering cell by processing the serving-cell data and the interfering-cell data (step S1140). SIC may be performed as an interference cancellation method.

FIG. 12 shows a wireless apparatus for implementing an embodiment of the present invention. The method of FIG. 11 may be performed by a wireless apparatus 1100. The wireless apparatus 1100 includes a control channel monitor 1110, a data processor 1120, and an interference canceller 1130.

The control channel monitor 1110 monitors a plurality of candidate control channels in a search space of a serving cell and a neighbor cell.

The data processor 1120 restores serving-cell data received over a first PDSCH indicated by a first PDCCH of the serving cell, and restores neighbor-cell data received over a second PDSCH indicated by a second PDCCH of the neighbor cell.

The interference canceller 1130 cancels interference by performing SIC on the serving-cell data and the interfering-cell data.

Now, interference coordination for mitigating inter-cell interference between a macro cell and a micro cell will be described.

A micro BS may report interference information to a macro UE. The interference information may be a resource region, precoding, a subframe pattern, or the like used by the micro cell A CSG cell such as a femto cell generally has a small number of UEs, and has a high possibility that scheduling changes one time per millisecond. Therefore, it is enough to exchange interference information between the micro BS and the macro UE with a relatively long period.

The interference information may be broadcast to the macro UE as a part of system information of the micro cell. Alternatively, the interference information may be transmitted over a PDCCH, and information for PDCCH monitoring may be shared between the macro UE and the micro cell.

When the macro UE obtains the interference information from the micro cell, the obtained information may be used for interference coordination. The macro UE may generate channel feedback information described below based on the interference information, and may feed back the generated information to the serving cell.

For one example, the macro UE may use micro cell's precoding information included in the interference information when a precoding matrix indication (PMI) to be fed back to the macro cell (i.e., serving cell) is determined. The macro UE may estimate an effective channel based on a reference signal of the micro cell and the precoding information of the micro cell, and may calculate a PMI to be fed back by considering interference nulling to minimize interference of an interference signal.

For another example, the macro UE may select a subband by considering a resource region of the micro cell, and may feed back the selected subband and a channel quality indicator (CQI) to the macro cell. According to 3GPP TS 36.213 V8.5.0 (2008-12), a full frequency band is divided into a plurality of subbands, and the UE feeds back the selected subband among the plurality of subbands and the CQI of the selected subband.

If a frequency band in which the macro cell overlaps with the micro cell is defined as an interference resource region, the macro UE can know the interference resource region from a resource region used by the micro cell. The macro UE may feed back information on a subband corresponding to the resource region used by the micro cell or the interference resource region to the macro cell. Alternatively, by regulating a CQI of the subband corresponding to the interference resource region to a low value (e.g., the CQI of the subband corresponding to the interference resource region may be set to the lowest value) or by allowing the subband to be unselected, it is possible to request the macro cell not to perform scheduling in the resource region of the micro cell.

For another example, the macro UE may request the macro cell to perform scheduling in a subframe having a relatively small interference with respect to the micro cell by considering a subframe pattern of the micro cell. The subframe pattern may indicate a scheduling amount of the micro cell for each subframe. For example, if the micro cell operates in a discontinuous reception (DRX) mode, subframes in which the micro cell is not used exist in every DRX period. Therefore, the macro UE requests the macro cell to perform scheduling in the subframes in which the micro cell is not used.

The macro cell may obtain interference information of the micro cell from the macro UE. Alternatively, the macro cell may obtain the interference information directly from the micro cell. When the macro cell obtains the interference information of the micro cell, the obtained information may be used for interference coordination.

For one example, the macro cell may allocate a resource to the macro UE neighboring to the micro cell by avoiding a resource region used by the micro cell. In this case, the macro UE may report location information to the macro cell to indicate that the macro UE is located near the micro cell.

For another example, the macro cell may allocate a resource to the macro UE neighboring to the micro cell by avoiding a subframe used by the micro cell. In this case, the macro UE may report location information to the macro cell to indicate that the macro UE is located near the micro cell.

Figure 13:
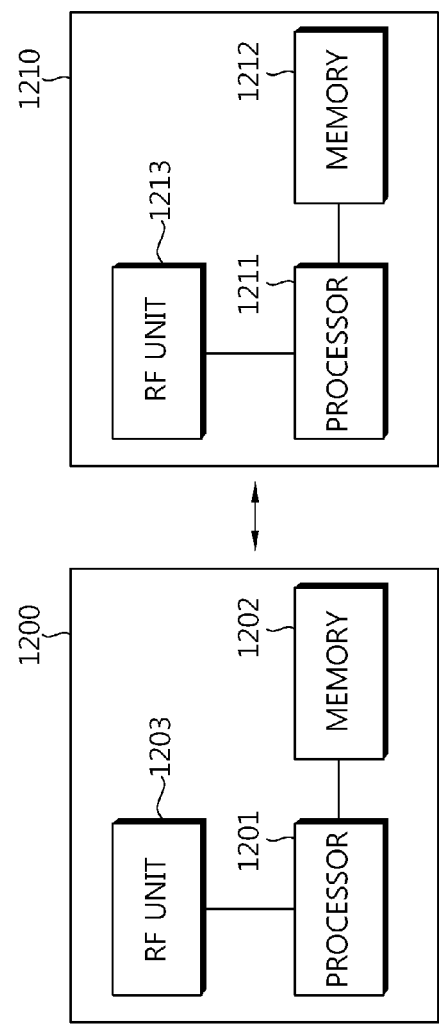
FIG. 13 is a block diagram showing a wireless communication system for implementing an embodiment of the present invention.

FIG. 13 is a block diagram showing a wireless communication system for implementing an embodiment of the present invention.

A BS 1200 includes a processor 1201, a memory 1202, and a radio frequency (RF) unit 1203.

The processor 1201 implements the proposed functions, processes, and/or methods. In the aforementioned embodiment, an operation of the macro BS or micro BS may be implemented by the processor 1201. The processor 1201 may provide interference information and configure a DL physical channel.

The memory 1202 is coupled to the processor 1201, and stores a protocol or parameter for an interference mitigation operation. The RF unit 1203 is coupled to the processor 1201, and transmits and/or receives a radio signal.

A UE 1210 includes a processor 1211, a memory 1212, and an RF unit 1213.

The processor 1211 implements the proposed functions, processes, and/or methods. In the aforementioned embodiment, an operation of the UE may be implemented by the processor 1211. The processor 1211 may monitor a PDCCH in a search space and perform an interference mitigation operation.

The memory 1212 is coupled to the processor 1211, and stores a protocol or parameter for a multiple carrier operation. The RF unit 1213 is coupled to the processor 1211, and transmits and/or receives a radio signal.

The processors 1201 and 1211 may include application-specific integrated circuit (ASIC), other chipset, logic circuit and/or data processing device. The memories 1202 and 1212 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory and executed by the processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of mitigating inter-cell interference in a wireless communication system, the method comprising:
   receiving, by a user equipment (UE), serving-cell data over a first data channel indicated by a first control channel for which decoding is successful by monitoring a plurality of candidate control channels in a search space of a serving cell; and
   receiving, by the UE, interfering-cell data over a second data channel indicated by a second control channel for which decoding is successful by monitoring a plurality of candidate control channels in a search space of an interfering cell,
   wherein when a frequency band of the first data channel overlaps with a frequency band of the second data channel,
   cancelling, by the UE, interference by subtracting re-generated interfering-cell data from the received serving-cell data and the received interfering-cell data,
   wherein the re-generated interfering-cell data is generated by the UE via the following steps:
   decoding the received interfering-cell data at the overlapping frequency band;
   re-encoding data which is successfully decoded; and
   multiplying an estimated second data channel with the re-encoded data.

2. The method of claim 1, wherein a frequency band of the serving cell entirely or partially overlaps with a frequency band of the interfering cell.

3. The method of claim 2, wherein the serving cell uses a first component carrier, the neighbor cell uses a second component carrier, and a frequency band of the first component carrier entirely or partially overlaps with a frequency band of the second component carrier.

4. The method of claim 1, further comprising receiving information for triggering monitoring on a control channel of the interfering cell from the serving cell.

5. The method of claim 1, wherein decoding is successful if no error occurs when an interference identifier is de-masked from a cyclic redundancy check (CRC) of downlink control information (DCI) of the second control channel.

6. The method of claim 5, wherein information on the interference identifier is obtained from the interfering cell.

7. The method of claim 5, wherein information on the interference identifier is obtained from the serving cell.

8. The method of claim 1, wherein a resource for transmitting the first control channel does not overlap with a resource for transmitting the second control channel.

9. The method of claim 8, wherein a resource for transmitting the first data channel partially or entirely overlaps with a resource for transmitting the second data channel.

10. A wireless user equipment (UE) comprising:
    a control channel monitor configured to monitor a plurality of candidate control channels in a search space of a serving cell and a neighbor cell;
    a data processor configured to restore serving-cell data on a first data channel indicated by a first control channel of the serving cell, and to restore neighbor-cell data over a second data channel indicated by a second control channel of the neighbor cell; and
    wherein when a frequency band of the first data channel overlaps with a frequency band of the second data channel,
    an interference canceller configured to cancel interference by subtracting re-generated interfering-cell data from the received serving-cell data and the received interfering-cell data,
    wherein the re-generated interfering-cell data is generated by the UE via the following steps:
    decoding the received interfering-cell data at the overlapping frequency band;
    re-encoding data which is successfully decoded; and
    multiplying an estimated second data channel with the re-encoded data.

11. The wireless apparatus of claim 10, wherein a frequency band of the serving cell entirely or partially overlaps with a frequency band of the interfering cell.

12. The apparatus of claim 11, wherein the serving cell uses a first component carrier, the neighbor cell uses a second component carrier, and a frequency band of the first component carrier entirely or partially overlaps with a frequency band of the second component carrier.

13. The apparatus of claim 10, wherein in the interference canceller, the interfering-cell data is an encoded interfering-cell data.

* * * * *